No. 804,954. PATENTED NOV. 21, 1905.
E. & C. JOHANSON.
BEARING FOR VEHICLES.
APPLICATION FILED JULY 2, 1904.
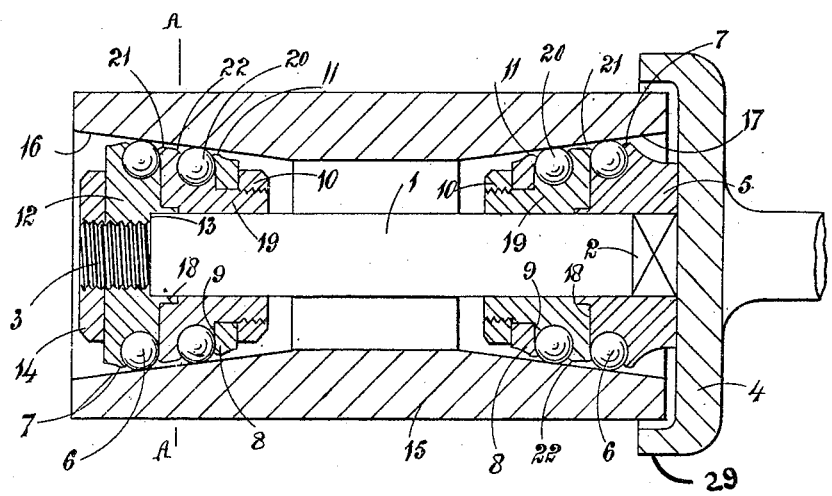
Witnesses:
E. S. Baldwin
E. P. O'Donnell
Inventors:—
Eric Johanson
Charles Johanson
By Hewitt Hayward
Attorney

UNITED STATES PATENT OFFICE.

ERIC JOHANSON AND CHARLES JOHANSON, OF DILLMANSTOWN, KUMARA, NEW ZEALAND.

BEARING FOR VEHICLES.

No. 804,954.  Specification of Letters Patent.  Patented Nov. 21, 1905

Application filed July 2, 1904. Serial No. 215,160.

*To all whom it may concern:*

Be it known that we, ERIC JOHANSON and CHARLES JOHANSON, subjects of His Majesty the King of Great Britain and Ireland, residing at Dillmanstown, Kumara, in the Provincial District of Westland, in the Colony of New Zealand, have invented new and useful Improvements in Bearings for Vehicles, of which the following is a specification.

This invention relates to bearings which are characterized by being specially provided with means for reducing friction to a minimum, and according thereto a ball-bearing is so constructed that the balls will not fall from their race when the bearing is removed from its cone.

The drawing herewith is a longitudinal section of the invention.

Referring to the drawing, the axle 1 has a neck 2 square in cross-section, a screwed end 3, and a cup-shaped flange 4. A socket 5 fits upon the axle and has a square hole through part of its length to fit the square neck 2. A race or groove is cut in the socket to receive the balls 6, and a rim or lip 7 is formed around the groove. Another socket 12 fits and is screwed upon the end 3 of the axle, which has a shoulder 13, against which the socket is held by a nut 14. The sockets 5 and 12 have a square boss 18, and a second socket 19, having a race or groove to receive the balls 20, has a square hole through part of its length to engage the boss 18. A rim 21 is formed on the socket 19 to overlap the balls 6, and another rim 22 upon the same socket overlaps the balls 20. A washer 8 fits upon the socket 19 and is held in position against a shoulder 9 by a nut 10, screwed upon the socket. A rim 11 is formed upon the said washer. The rims 7 and 21 and the rims 11 and 22 extend beyond the half-diameter of the balls within their races, with the result that when the socket 5 or 12 is removed from the hub the balls do not fall out and get lost.

The hub 15 of the wheel or a bush therein is made hollow and has its ends 16 and 17 conical, with the narrow ends of the cone toward the center of the hub. The conical ends 16 and 17 of the hub rest upon the balls 6 and 20, the races for which have diameters which bring the balls to an accurate bearing within the conical ends. The flange 4 of the axle has a rim 29 covering the inner end of the hub, for the purpose of excluding mud and dust from the bearing.

What we claim, and desire to secure by Letters Patent of the United States, is—

For the purpose indicated, in combination, a wheel-hub having its ends bored conically, an axle passing into the hub, a socket having a race and fitting the axle and engaging a portion square in section of the axle, a socket having a race and fitting the end of the axle being screwed thereon, a nut on the axle to retain said socket in position, there being square bosses upon the sockets, other sockets having races and having holes engaging the bosses, washers upon the sockets, balls within the races, there being rims upon the sockets and washers for retaining the washers on the sockets, as set forth.

In testimony whereof we have signed our names to this specification in the presence of two subscribing witnesses.

ERIC JOHANSON.
CHAS. JOHANSON.

Witnesses:
G. R. RUDKIN,
H. E. ANDERSON.